US 8,844,891 B2

(12) United States Patent
Yamada et al.

(10) Patent No.: US 8,844,891 B2
(45) Date of Patent: Sep. 30, 2014

(54) SLIDE APPARATUS FOR VEHICLE AND ROLLING ELEMENT CIRCULATION UNIT FOR THE SAME

(75) Inventors: Yukifumi Yamada, Toyota (JP); Shinya Isobe, Nagoya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 313 days.

(21) Appl. No.: 13/235,907

(22) Filed: Sep. 19, 2011

(65) Prior Publication Data

US 2012/0074288 A1   Mar. 29, 2012

(30) Foreign Application Priority Data

Sep. 28, 2010  (JP) .................................. 2010-217139

(51) Int. Cl.
  *F16M 13/00*  (2006.01)
  *B60N 2/07*   (2006.01)
(52) U.S. Cl.
  CPC ............ *B60N 2/0705* (2013.01); *B60N 2/0715* (2013.01)
  USPC .......................................... 248/430; 248/429
(58) Field of Classification Search
  USPC .................... 248/429, 430; 296/65.13, 65.14; 297/344.1, 344.11; 384/43
  See application file for complete search history.

(56) References Cited

U.S. PATENT DOCUMENTS

| | | | |
|---|---|---|---|
| 8,152,252 B2 * | 4/2012 | Liang et al. ................. | 312/334.6 |
| 8,419,280 B2 * | 4/2013 | Kasukawa et al. ............... | 384/45 |
| 2003/0206669 A1 * | 11/2003 | Smith .............................. | 384/47 |
| 2004/0101225 A1 * | 5/2004 | Del Rio et al. ................. | 384/553 |
| 2011/0089306 A1 * | 4/2011 | Yamada et al. ............... | 248/430 |
| 2012/0199719 A1 * | 8/2012 | Yamada et al. ............... | 248/430 |

FOREIGN PATENT DOCUMENTS

| | | |
|---|---|---|
| GB | 2437911 | 11/2007 |
| JP | 1-121712 | 8/1989 |
| JP | 8-170641 | 7/1996 |
| JP | 9-71157 | 3/1997 |
| JP | 2005-155798 | 6/2005 |
| JP | 2009-133449 | 6/2009 |
| WO | 2006/100846 | 9/2006 |
| WO | WO 2010/024210 A1 | 3/2010 |
| WO | WO 2011/055591 A1 | 5/2011 |

OTHER PUBLICATIONS

U.S. Appl. No. 13/501,479, filed Apr. 12, 2012, Yamada et al.
Office Action issued Jul. 1, 2014, in Japanese Patent Application No. 2010-217139, filed Sep. 28, 2010 (with English language translation).

* cited by examiner

*Primary Examiner* — Gwendolyn W Baxter
(74) *Attorney, Agent, or Firm* — Oblon, Spivak, McClelland, Maier & Neustadt, L.L.P.

(57) ABSTRACT

A slide apparatus for a vehicle includes first and second rails and a rolling element circulation unit including first and second cases and a plurality of rolling elements accommodated within a receiving portion that includes first and second annular receiving portions accommodating the rolling elements annularly arranged in a rolling and circulating manner. The second case includes elongated bores connected to the first and second annular receiving portions in a state where the second case is mounted at the second rail. A portion of the rolling elements is exposed from the elongated bores while being inhibited from disengaging from the elongated bores. The rolling elements exposed from the elongated bores make contact with an operating surface of the first rail and inner surfaces of the first and second annular receiving portions, and roll and circulate in association with a relative movement between the first and second rails.

9 Claims, 7 Drawing Sheets

F I G. 1
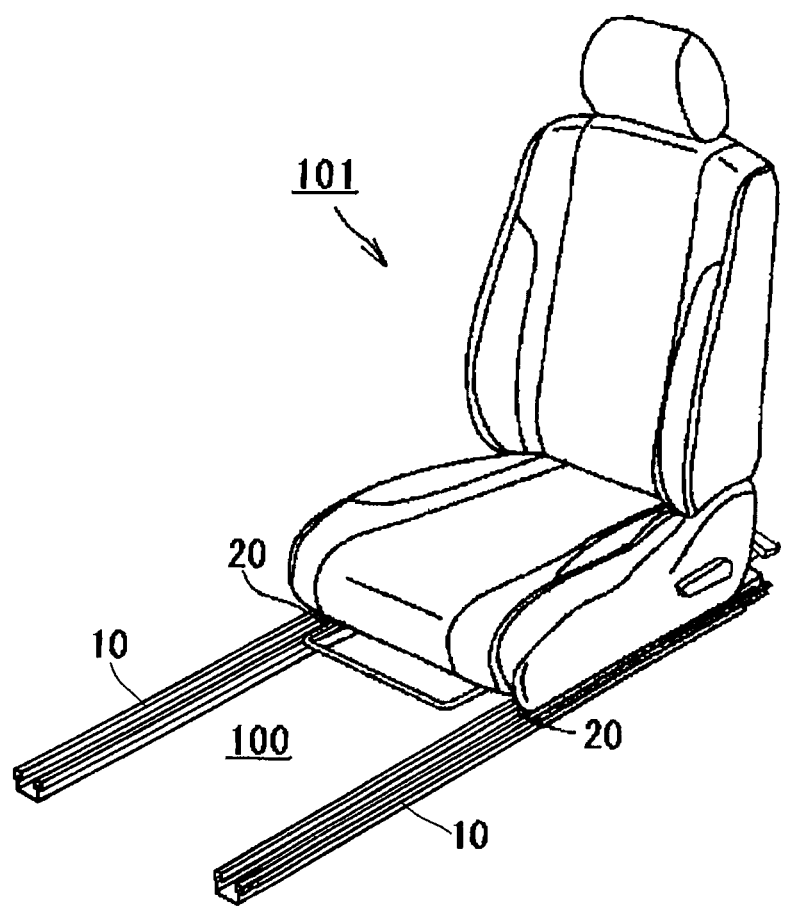

SLIDE APPARATUS FOR VEHICLE AND ROLLING ELEMENT CIRCULATION UNIT FOR THE SAME

CROSS REFERENCE TO RELATED APPLICATIONS

This application is based on and claims priority under 35 U.S.C. §119 to Japanese Patent Application 2010-217139, filed on Sep. 28, 2010, the entire content of which is incorporated herein by reference.

TECHNICAL FIELD

This disclosure generally relates to a slide apparatus for a vehicle and a rolling element circulation unit used for the slide apparatus.

BACKGROUND DISCUSSION

JP9071157A (hereinafter referred to as Reference 1), for example, discloses a known seat slide apparatus for a vehicle. The seat slide apparatus disclosed in Reference 1 includes a lower rail fixed to a vehicle floor and an upper rail slidably engaging with the lower rail and attached to a vehicle seat. The upper rail includes a plate-shaped first upper rail and a plate-shaped second upper rail laminated on the first upper rail. In addition, a bracket is disposed between the first and second upper rails so as to rotatably support a metallic roller rolling relative to the lower rail. The upper rail is smoothly movable in the longitudinal direction of the vehicle along the lower rail accordingly. Further, the upper rail is formed to be a minimum length for supporting the vehicle seat while the lower rail is formed to be a maximum length for being arranged at the vehicle floor. As a result, the seat slide apparatus that is adjustable and movable with a large adjustment stroke is obtained.

According to the seat slide apparatus having the aforementioned configuration, for example, looseness may occur between the lower rail and the upper rail because of an assembly error of the roller relative to either the lower rail or the upper rail, dimensional variations between the lower rail and the upper rail, and the like. Therefore, according to the seat slide apparatus disclosed in Reference 1, a resin slider slidable with an inner wall surface of the lower rail is provided at a standing surface of the upper rail formed in parallel to a side surface of the lower rail to thereby restrain the looseness of the upper rail relative to the lower rail in vertical and horizontal directions. However, because the slider is constantly in contact with the inner wall surface of the lower rail, a sliding friction resistance may be generated at the aforementioned contact portion between the slider and the lower rail in a case where the upper rail moves in the longitudinal direction along the lower rail. As a result, the smooth movement of the upper rail relative to the lower rail in the longitudinal direction may be inhibited. A roller may be provided between the upper rail and the lower rail in a manner to make contact therewith in the vertical and horizontal directions so as to eliminate the sliding friction resistance. However, in that case, the size and cost of the seat slide apparatus may increase. In addition, the roller made of metal may not absorb the possible dimensional variations between the upper rail and the lower rail. Therefore, in conclusion, the smooth movement of the upper rail relative to the lower rail in the longitudinal direction may be disturbed.

In light of the foregoing, WO2010024210A1 (hereinafter referred to as Reference 2) discloses a seat slide apparatus for a vehicle including a rolling element circulation unit. The rolling element circulation unit includes a first case and a second case in which plural rolling elements are accommodated so as to roll and circulate within the first case and the second case. The rolling element circulation unit is assembled on a cut and lift portion (an operating portion) formed at an upper rail. In a case where the upper rail slidably moves relative to a lower rail, some of the rolling elements roll and circulate by making contact with an operating surface formed at the lower rail and an operating surface formed at the operating portion of the upper rail while the other of the rolling elements roll and circulate by making contact with a non-operating surface of the operating portion. As a result, the large and smooth sliding movement of the upper rail is achieved.

According to the seat slide apparatus disclosed in Reference 2, the rolling element circulation unit exercises a rolling circulation function in a state to be mounted on the operating portion of the upper rail. That is, the rolling element circulation unit functions in a state where the rolling elements make contact with the operating surfaces of the upper rail and the lower rail. Accordingly, a rolling performance of the rolling element circulation unit may depend on an accuracy of molding and/or assembly of each of the upper rail and the lower rail. Therefore, the rolling performance of the rolling element circulation unit may decrease because of variations of the aforementioned accuracy of each of the rails.

A need thus exists for a slide apparatus for a vehicle and a rolling element circulation unit for the slide apparatus which are not susceptible to the drawback mentioned above.

SUMMARY

According to an aspect of this disclosure, a slide apparatus for a vehicle includes a first rail provided at a vehicle, a second rail supported by the first rail and being movable relative to the first rail in an extending direction of the first rail, and a rolling element circulation unit including a first case, a second case engaging with the first case, and a plurality of rolling elements accommodated within a receiving portion defined by the first case and the second case, the rolling element circulation unit being fixed to an outer side portion of the second rail. The receiving portion is provided at facing surfaces of the first case and the second case and includes first and second annular receiving portions accommodating the plurality of rolling elements that are annularly arranged in a rolling and circulating manner. The second case includes elongated bores connected to the first and second annular receiving portions respectively and extending in an extending direction of the second rail in a state where the second case is mounted at the second rail. A portion of the rolling elements is exposed from the elongated bores while being inhibited from disengaging from the elongated bores. At least one of the first case and the second case includes a partition wall separating the rolling elements accommodated within the first annular receiving portion from the rolling elements accommodated within the second annular receiving portion so that the rolling elements accommodated within the first annular receiving portion and the rolling elements accommodated within the second annular receiving portion are inhibited from making contact with one another. The rolling elements exposed from the elongated bores make contact with an operating surface formed at the first rail and respective inner surfaces formed at the first and second annular receiving portions, and the rolling elements roll and circulate within the first and second annular receiving portions in association with a relative movement between the first rail and the second rail.

According to another aspect of this disclosure, a rolling element circulation unit for a slide apparatus for a vehicle, the slide apparatus including a first rail provided at a vehicle and a second rail supported by the first rail and being movable relative to the first rail in an extending direction of the first rail, the rolling element circulation unit includes a first case, a second case engaging with the first case, and a plurality of rolling elements accommodated within a receiving portion defined by the first case and the second case, the rolling element circulation unit being adapted to be fixed to an outer side portion of the second rail. The receiving portion is provided at facing surfaces of the first case and the second case and includes first and second annular receiving portions accommodating the plurality of rolling elements that are annularly arranged in a rolling and circulating manner. The second case includes elongated bores connected to the first and second annular receiving portions respectively and extending in an extending direction of the second rail in a state where the second case is mounted at the second rail. A portion of the rolling elements is exposed from the elongated bores while being inhibited from disengaging from the elongated bores. At least one of the first case and the second case includes a partition wall separating the rolling elements accommodated within the first annular receiving portion from the rolling elements accommodated within the second annular receiving portion so that the rolling elements accommodated within the first annular receiving portion and the rolling elements accommodated within the second annular receiving portion are inhibited from making contact with one another. In a case where the rolling element circulation unit is applied to the slide apparatus, the rolling elements exposed from the elongated bores make contact with an operating surface formed at the first rail and respective inner surfaces formed at the first and second annular receiving portions, and the rolling elements roll and circulate within the first and second annular receiving portions in association with a relative movement between the first rail and the second rail.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a perspective view schematically illustrating a slide apparatus for a vehicle according to a first embodiment disclosed here;

DETAILED DESCRIPTION

Embodiments of the disclosure will be explained with reference to the attached drawings. In the embodiments, directions and orientations such as left, right, front, rear, top, and bottom correspond to those when viewed from a passenger seated on a seat for a vehicle.

[First Embodiment]

A first embodiment will be explained with reference to FIGS. 1 to 5.

Figure 2:
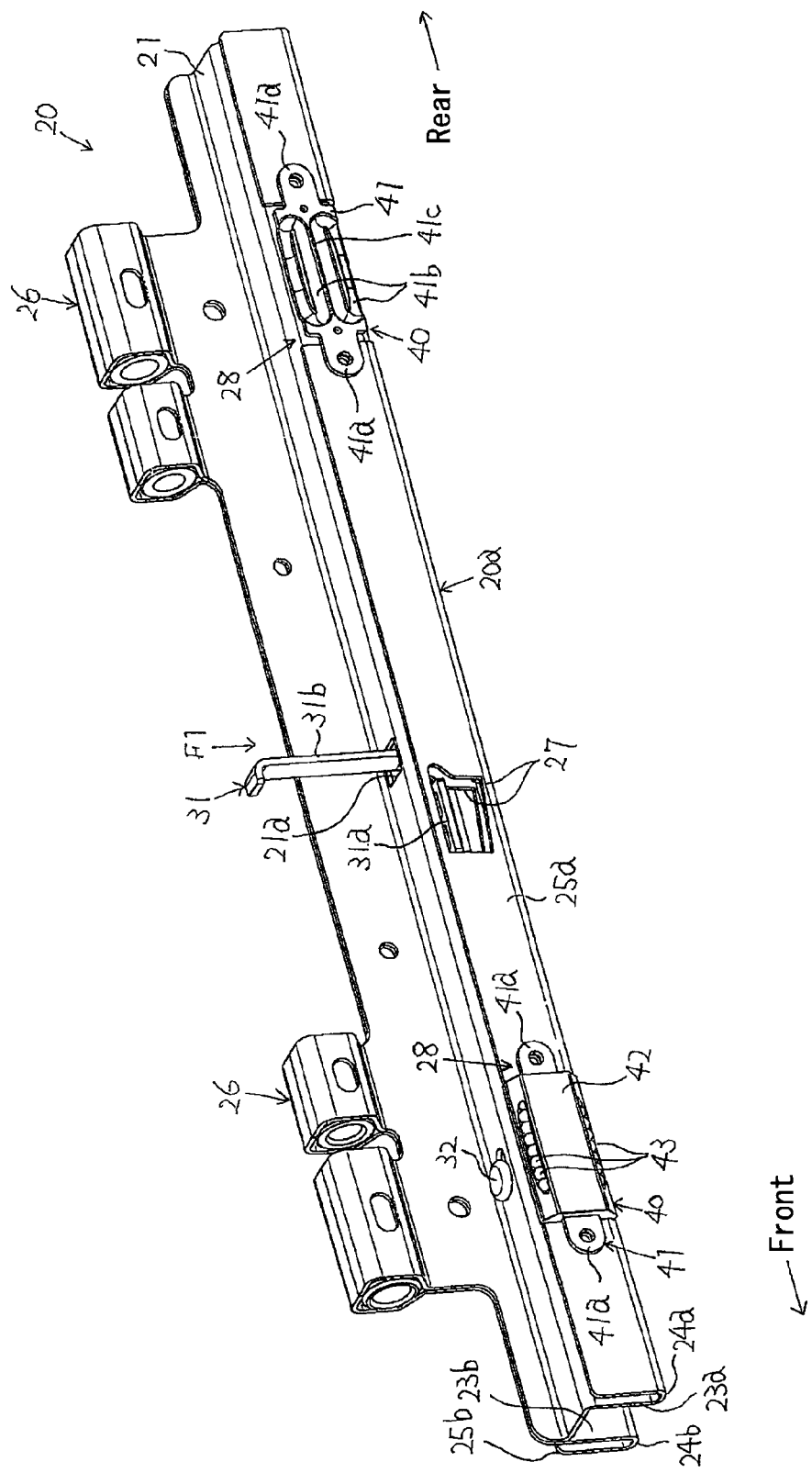
FIG. 2 is a perspective view of an upper rail of the slide apparatus according to the first embodiment.
Figure 3:
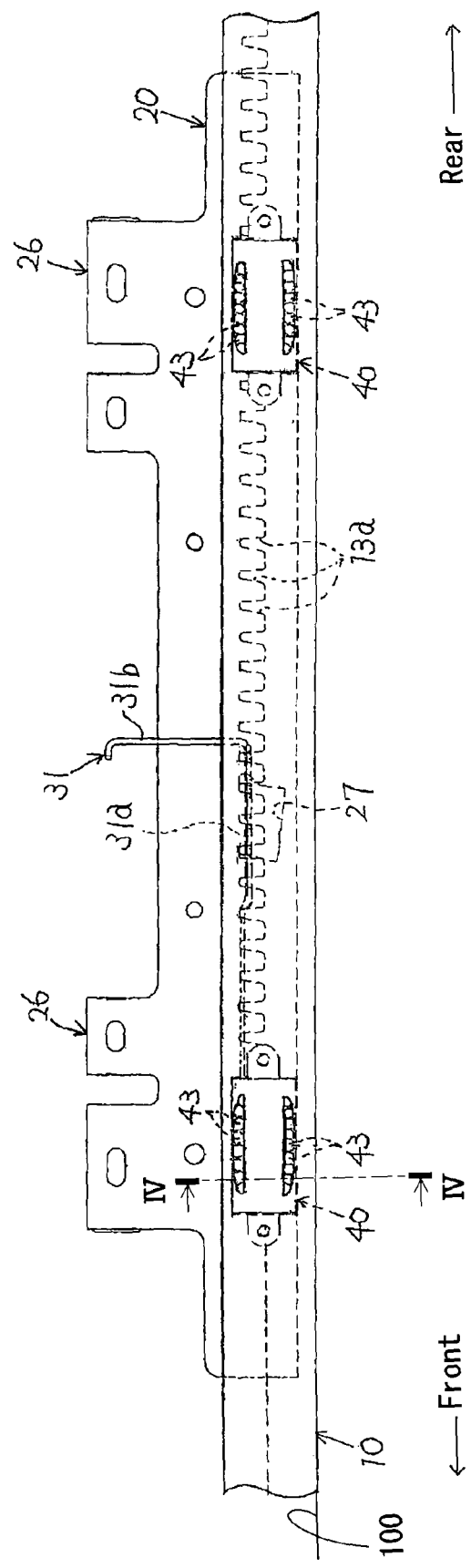
FIG. 3 is a side view of the slide apparatus according to the first embodiment.

As illustrated in FIGS. 1 to 3, a slide apparatus for a vehicle includes a pair of lower rails (right and left lower rails) 10 serving as a first rail, a pair of upper rails (right and left upper rails) 20 serving as a second rail, and a ball circulation unit 40 serving as a rolling element circulation unit. The pair of lower rails 10 is fixed to a vehicle floor 100 (vehicle) so as to extend in a longitudinal direction of the vehicle. The pair of upper rails 20 is fixed to a vehicle seat 101 and is movably supported relative to the pair of lower rails 10. The ball circulation unit 40 is attached to an attachment portion 28 formed at the upper rail 20.

Figure 4:
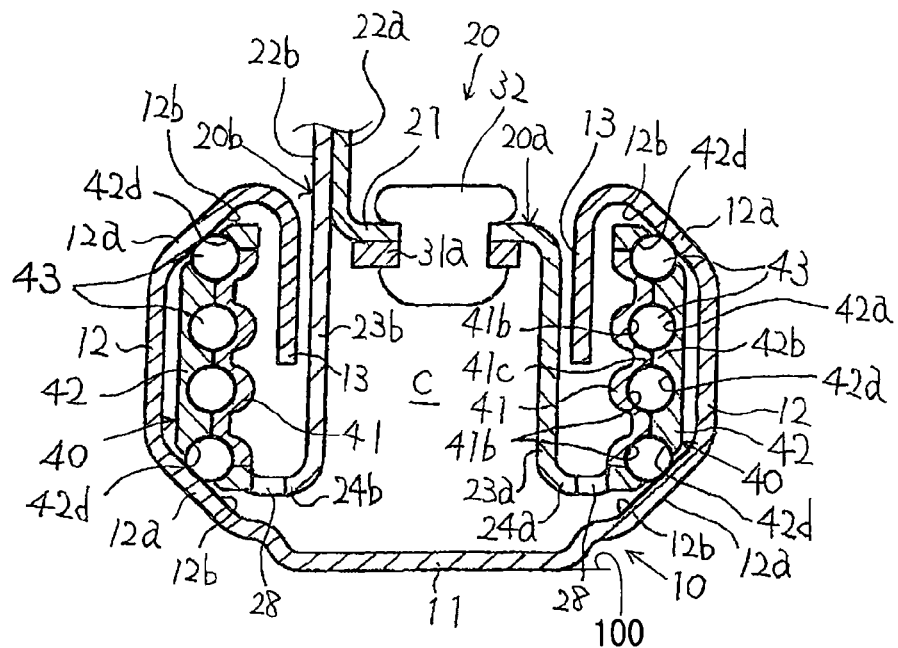
FIG. 4 is a cross-sectional view taken along the line IV-IV in FIG. 3.

As illustrated in FIG. 4, each of the lower rails 10 includes a bottom portion 11 formed to be in parallel to the vehicle floor 100, side portions 12 extending upwardly from both ends of the bottom portion 11, and folding portions 13 extending inwardly downwardly from both upper ends of the respective side portions 12. Inclined portions 12a are formed at upper and lower ends of the respective side portions 12 so as to be inclined inwardly. Inner side surfaces of the inclined portions 12a function as operating surfaces 12b. In addition, as illustrated in FIG. 3, plural lock recess portions 13a are formed at each of the folding portions 13 so as to be arranged at predetermined intervals along the longitudinal direction of the vehicle.

As illustrated in FIGS. 2 and 4, each of the upper rails 20 includes a first rail portion 20a and a second rail portion 20b. The first rail portion 20a includes a base plate portion 21 formed to be in parallel to the vehicle floor 100, a first connection plate 22a extending upwardly from one end of the base plate portion 21, a first folding portion 23a extending downwardly from the other end of the base plate portion 21. The first rail portion 20a also includes a first connecting portion 24a extending outwardly from a lower end of the first folding portion 23a and a first standing portion 25a (an outer side portion) extending upwardly from an outer end of the first connecting portion 24a. The second rail portion 20b includes a second connection plate 22b extending in a vertical direction of the vehicle, a second folding portion 23b extending downwardly from a lower end of the second connection plate 22b, a second connecting portion 24b extending outwardly from a lower end of the second folding portion 23b, and a second standing portion 25b (the outer side portion) extending upwardly from an outer end of the second connecting portion 24b. The first connection plate 22a of the first rail portion 20a and the second connection plate 22b of the second rail portion 20b are arranged to overlap each other to thereby form a void C surrounded by the base plate portion 21 and the first and second folding portions 23a and 23b. The upper rail 20 is configured in the aforementioned manner accordingly. Further, fitting portions 26 are formed at front and rear sides respectively (i.e., two fitting portions 26 are provided) at the first and second connection plates 22a and 22b as illustrated in FIG. 2 so as to be fitted to the vehicle seat 101.

As illustrated in FIG. 2, a first bore 21a is formed at a substantially center portion of the base plate portion 21 of the upper rail 20 in the longitudinal direction. In addition, a second bore 27 is formed so as to penetrate through the first and second folding portions 23a and 23b, and the first and second standing portions 25a and 25b of the upper rail 20. The second bore 27 is positioned slightly forward relative to the first bore 21a in the longitudinal direction. A lock lever 31 is arranged within the void C of the upper rail 20. The lock lever 31 includes a lock portion 31a extending in the longitudinal direction of the upper rail 20 and a lever portion 31b bending from a rear end of the lock portion 31a so as to extend upwardly. The lock lever 31 is connected to a front portion of the base plate portion 21 by means of an engagement pin 32 as illustrated in FIGS. 2 and 4. A portion of the lock portion 31a is movable in the vertical direction within the second bore 27 with reference to the aforementioned connected portion of the lock lever 31 relative to the base plate portion 21. The lever portion 31b penetrates through the first bore 21a and extends upwardly from the base plate portion 21. Accordingly, in a case where the lever portion 31b is operated downwardly as illustrated by an arrow F1 in FIG. 2, the lock portion 31a moves downward relative to the connected portion. In a state where the upper rail 20 is assembled on the lower rail 10, the lock portion 31a is engageable and disengageable relative to the lock recess portions 13a formed at the lower rail 10. The lock portion 31a engages with the lock recess portions 13a when being positioned upwardly. On the other hand, the lock portion 31a disengages from the lock recess portions 13a when moving downwardly from the upward position.

As illustrated in FIGS. 2 and 4, attachment portions 28 are formed in the vicinity of both end portions of each of the first and second standing portions 25a and 25b of the upper rail 20 in the longitudinal direction. The ball circulation units 40 are mounted on the respective attachment portions 28. Each of the attachment portions 28 is constituted by a cut portion and both side portions of the cut portion formed at the standing portion 25a or 25b. Specifically, according to the present embodiment, two of the ball circulation units 40 are provided at the first standing portion 25a while two of the ball circulation units 40 are provided at the second standing portion 25b. That is, according to the present embodiment, four of the ball circulation units 40 in total are provided at each of the upper rails 20.

As illustrated in FIGS. 2 to 6, each of the ball circulation units 40 includes a first case 41, a second case 42 engaging with the first case 41 so as to be assembled thereon, and plural balls 43 serving as a plurality of rolling elements accommodated within a receiving portion defined by the first and second cases 41 and 42. The first and second cases 41 and 42 are constituted so as to be engageable with each other by means of an adhesive, a fitting structure, or the like. According to the present embodiment, the first case 41 is made of a metallic material while the second case 42 is made of a resin material.

Figure 5:
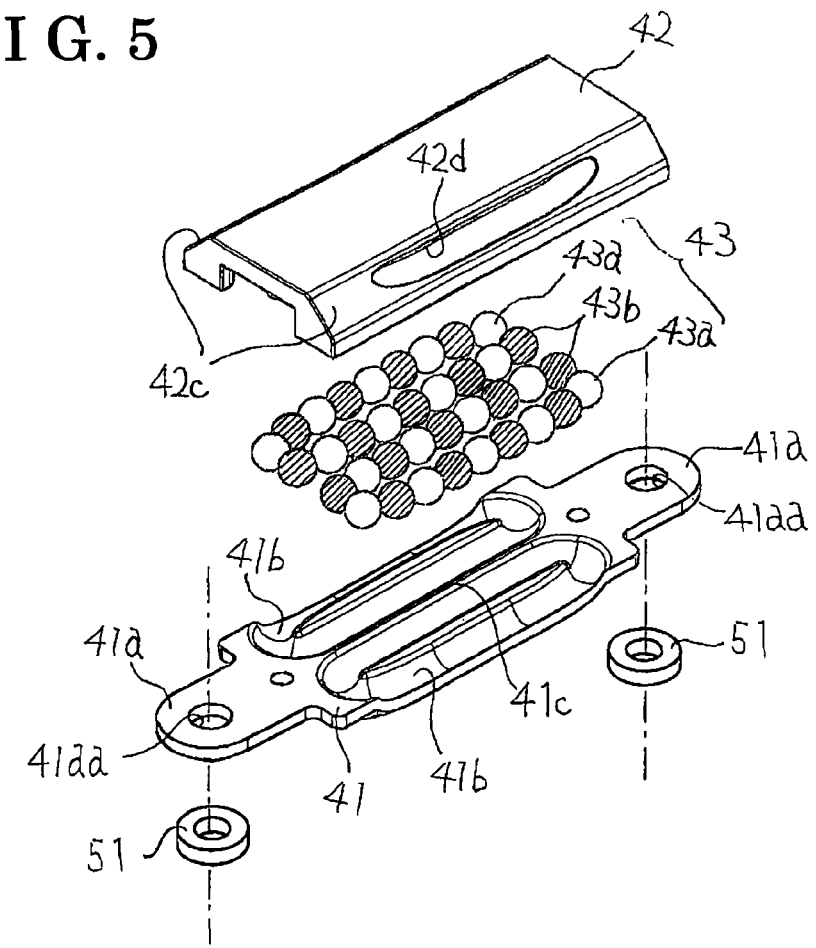
FIG. 5 is an exploded perspective view illustrating a configuration of a ball circulation unit of the slide apparatus according to the first embodiment.

Flange portions 41a are formed at both ends of the first case 41 in the longitudinal direction so as to extend from the second case 42 in a state where the first case 41 engages with the second case 42. The flange portions 41a are fixed to the both side portions of the cut portion constituting the attachment portion 28. Specifically, penetration bores 41aa are formed at the respective flange portions 41a while through-holes are formed at the both side portions of the cut portion of the upper rail 20. Then, screws, for example, are inserted into the penetration bores 41aa and the through-holes so that the first case 41 is mounted on the attachment portion 28. According to the present embodiment, as illustrated in FIG. 5, the first case 41 is mounted on the attachment portion 28 in a state where a biasing member 51 is disposed between each of the flange portions 41a and the attachment portion 28. The first case 41 is accommodated within the cut portion constituting the attachment portion 28.

As illustrated in FIGS. 2 and 4, a pair of annular receiving portions 41b serving as first and second annular receiving portions is formed at a surface of the first case 41 so as to face the second case 42. Each of the pair of annular receiving portions 41b is constituted in such a manner that a groove having a semicircle shape in a cross section is annularly formed as illustrated in FIG. 5. The pair of annular receiving portions 41b is positioned to overlap in the vertical direction in a state where the ball circulation unit 40 is attached to the upper rail 20. Each of the pair of annular receiving portions 41b is formed into an elongated annular shape elongated to both edges of the first case 41 where the flange portions 41a are formed. In addition, a first partition wall portion 41c is formed between the pair of annular receiving portions 41b so that the balls 43 accommodated in one of the annular receiving portions 41b are inhibited from making contact with the balls 43 accommodated in the other of the annular receiving portions 41b.

A pair of annular accommodating portions 42a serving as the first and second annular receiving portions and a second partition wall portion 42b are formed at a surface of the second case 42 so as to face the first case 41. Specifically, the pair of annular accommodating portions 42a face the pair of annular receiving portions 41b while the second partition wall portion 42b faces the first partition wall portion 41c. Therefore, in a state where the first and second cases 41 and 42 engage with each other, the annular receiving portions 41b and the annular accommodating portions 42a match each other while the first and second partition wall portions 41c and 42b match each other to thereby constitute the receiving portion where the plural balls 43 are accommodated. The plural balls 43 (according to the present embodiment, 36 of the balls 43) are accommodated within the annular receiving portions 41b and the annular accommodating portions 42a so as to roll and circulate therewithin. According to the present embodiment, the balls 43 include metallic balls 43a serving as metallic rolling elements and resin balls 43b serving as resin rolling elements. The metallic balls 43a and the resin balls 43b are alternately arranged within each of the annular receiving portions 41b. In FIG. 5, the resin balls 43b are illustrated with hatching.

Inclined portions 42c are formed at a surface of the second case 42 so as to face respective operating surfaces 12b of the lower rail 10 in a state where the ball circulation unit 40 is attached to the attachment portion 28 of the upper rail 20. The inclined portions 42c are formed at upper and lower portions of the second case 42 respectively. Elongated bores 42d are formed at the respective inclined portions 42c so as to extend in the longitudinal direction of the rails 10 and 20 and to be connected to the respective annular receiving portions 41b. A portion of the plural balls 43, i.e., some of the plural balls 43 accommodated within the annular receiving portions 41b are exposed from the elongated bores 42d. A width of each of the elongated bores 42d is specified to be smaller than a diameter of each of the balls 43 so that the balls 43 are inhibited from disengaging from the annular receiving portions 41b. The elongated bore 42d is formed in such a manner that both end portions of the elongated bore 42d in the longitudinal direction are slightly curved while a center portion extends substantially linearly in the longitudinal direction.

As illustrated in FIG. 4, the annular receiving portions 41b and the annular accommodating portions 42a are configured so that the balls 43 are arranged in a straight line in the vertical direction in a state where the ball circulation unit 40 is attached to the upper rail 20. In addition, according to the present embodiment, the first case 41 is made of the metallic material while the second case 42 is made of the resin material. At this time, the first and second cases 41 and 42 are not limited to be made of the aforementioned materials. Both of the first and second cases 41 and 42 may be made of the resin material, the metallic material, or the like.

An operation of the slide apparatus having the aforementioned configuration will be explained below.

As illustrated in FIG. 4, in a case where the ball circulation units 40 are attached to the respective attachment portions 28 of the upper rail 20 and then the upper rail 20 is assembled on the lower rail 10, the portion of the plural balls 43 (i.e., some of the plural balls 43) exposed from the elongated bores 42d makes contact with the operating surfaces 12b of the lower rail 10 and with inner surfaces of the annular receiving portions 41b. Then, in a case where the upper rail 20 slidably moves relative to the lower rail 10 in the longitudinal direction, some of the balls 43 in contact with the operating surfaces 12b and the inner surfaces of the annular receiving portions 41b and the other of the balls 43 accommodated within the annular receiving portions 41b and the annular accommodating portions 42a roll and circulate. Specifically, the balls 43 positioned at an inner side of the first case 41 (i.e., a side where the elongated bores 42d are not formed) move to an outer side of the first case 41 (i.e., a side where the elongated bores 42d are formed) while the balls 43 positioned at the outer side of the first case 41 move to the inner side thereof. The balls 43 sequentially repeat the aforementioned movement. Accordingly, the large and smooth sliding movement of the upper rail 20 relative to the lower rail 10 is obtained. In addition, because the biasing members 51 are disposed between the flange portions 41a and the attachment portion 28 in a case where the first case 41 is attached to the attachment portion 28 of the upper rail 20, a contact pressure generated at a contact portion between the balls 43, the operating surfaces 12b, and the inner surfaces of the annular receiving portions 41b is absorbed by the biasing members 51. As a result, an increase of a contact resistance at the aforementioned contact portion is restrained and a further smooth sliding movement of the upper rail 20 is achieved.

According to the aforementioned embodiment, the plural balls 43 accommodated within the annular receiving portions 41b and the annular accommodating portions 42a move and circulate within the annular receiving portions 41b and the annular accommodating portions 42a while rolling and making contact with the operating surfaces 12b of the lower rail 10 and the inner surfaces of the annular receiving portions 41b of the first case 41 in association with the sliding movement of the upper rail 20 relative to the lower rail 10. Therefore, the large and smooth sliding movement of the upper rail 20 relative to the lower rail 10 is achieved. In addition, the balls 43 roll while making contact with the operating surfaces 12b and the inner surfaces of the annular receiving portions 41b of the lower rail 10. Thus, as compared to a case where the balls 43 roll while making contact with the lower rail 10 and the upper rail 20, increase and decrease of the rolling resistance of the balls 43 caused by a molding accuracy and an assembly accuracy of the rails 10 and 20 are appropriately restrained. Thus, the large and smooth sliding movement of the upper rail 20 relative to the lower rail 10 is further appropriately achieved. Further, because the operating surface is not necessarily formed at the upper rail 20 so as to make contact with the balls 43, the configuration of the upper rail 20 is simplified. Furthermore, because of the partition wall portions 41c and 42b, the balls 43 arranged within one of the annular receiving portions 41b and one of the annular accommodating portions 42a matching each other are inhibited from making contact with the balls 43 arranged within the other of the annular receiving portions 41b and the other of the annular accommodating portions 42a matching each other. Thus, the rolling circulation of the balls 43 is smoothly conducted, thereby restraining an occurrence of a rolling failure, a circulation failure, and the like of the balls 43.

In addition, according to the aforementioned embodiment, the mounting of each of the ball circulation units 40 on the upper rail 20 is completed by attaching the flange portions 41a of the first case 41 to the attachment portion 28 of the upper rail 20. Therefore, the ball circulation unit 40 is easily mounted on the upper rail 20.

Further, according to the aforementioned embodiment, the biasing members 51 are disposed between the ball circulation unit 40 and the upper rail 20. Thus, even when an excessive stress is generated among the balls 43, the operating surfaces 12b of the lower rail 10, and the inner surfaces of the annular receiving portions 41b, the stress is reduced because of an elastic deformation of each of the biasing members 51. As a result, the decrease of the rolling performance of the balls 43 is appropriately restrained. The further smooth sliding movement of the upper rail 20 relative to the lower rail 10 is obtained.

Furthermore, according to the aforementioned first embodiment, the balls 43 include the metallic balls 43a and the resin balls 43b which are alternately arranged each other. Thus, a contact noise between the adjacent balls 43 is restrained. In addition, because of the metallic balls 43a, the strength of the ball circulation unit 40 is ensured.

[Second Embodiment]

A second embodiment will be explained with reference to FIGS. 6 to 9. The second embodiment differs from the first embodiment in a portion of the configuration of the ball circulation unit 40. In the following, a difference of the second embodiment from the first embodiment will be mainly explained. The same configurations of the second embodiment bear the same reference numerals as the first embodiment.

Figure 6A:
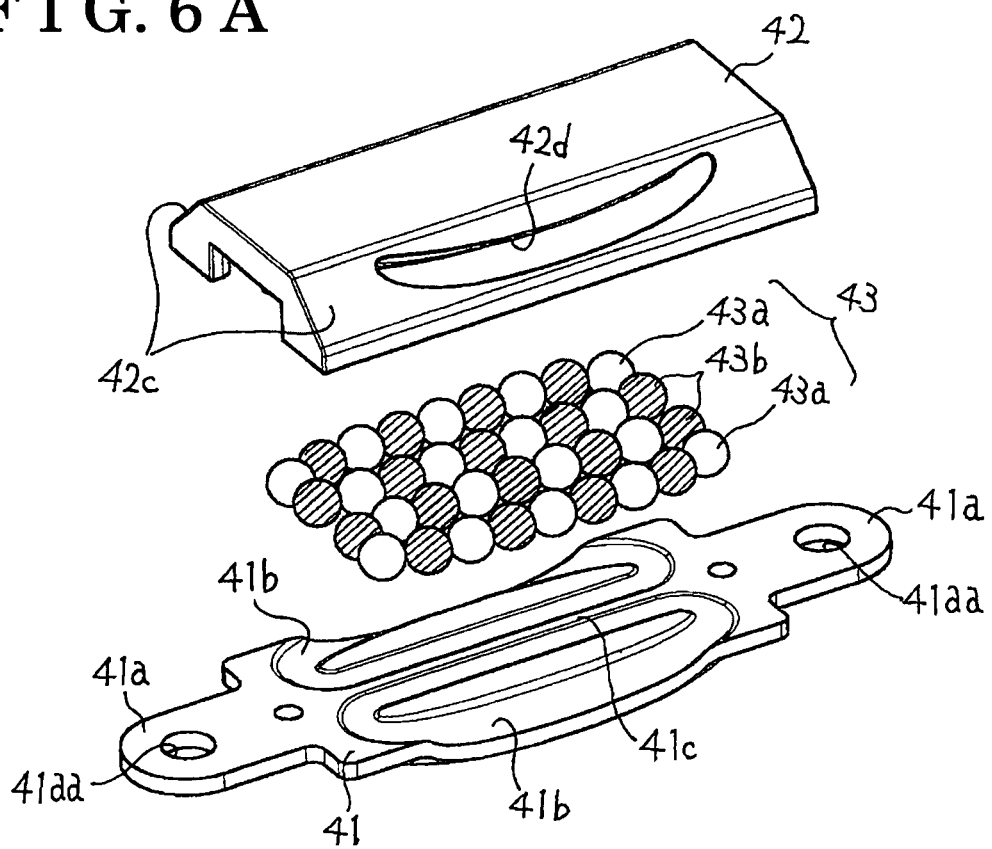
FIG. 6A is an exploded perspective view illustrating the configuration of the ball circulation unit according to a second embodiment disclosed here.
Figure 6B:
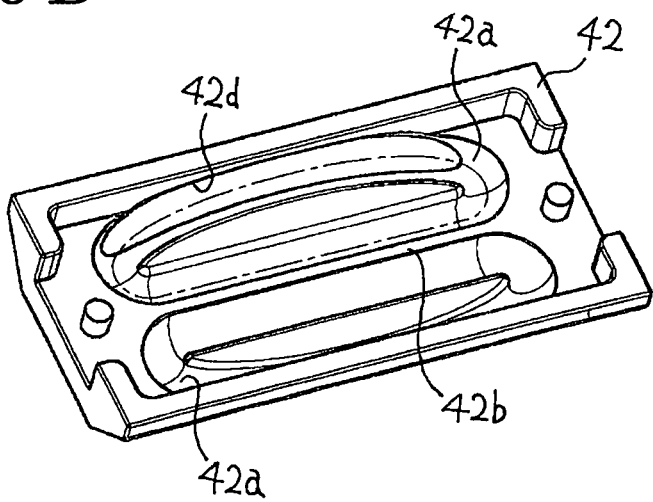
FIG. 6B is a perspective view of a second case of the ball circulation unit according to the second embodiment.
Figure 7:
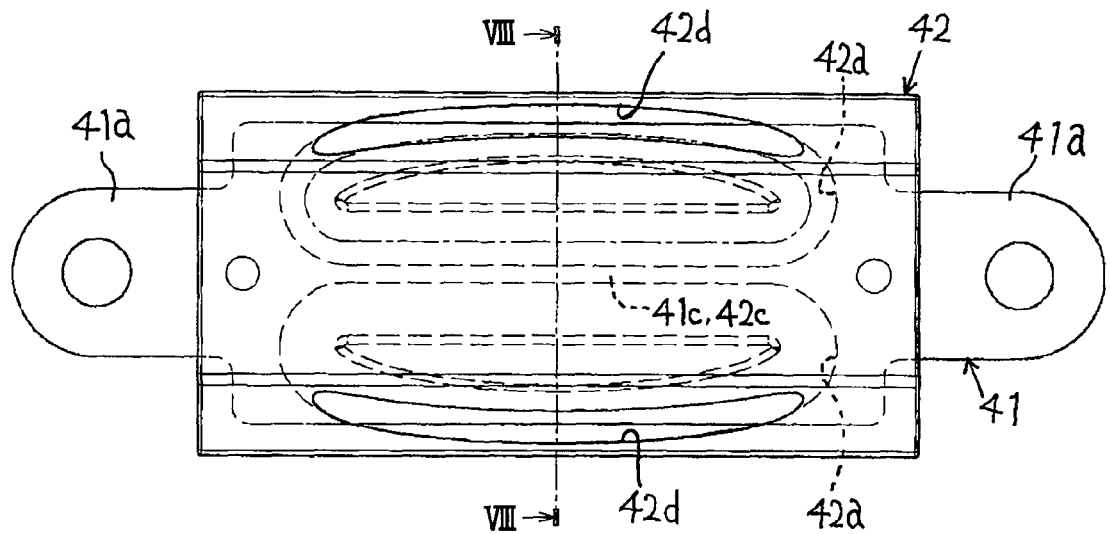
FIG. 7 is a front view of the ball circulation unit according to the second embodiment.

As illustrated in FIGS. 6 and 7, each of the ball circulation units 40 includes the first case 41, the second case 42, and the plural balls 43. In the ball circulation unit 40 according to the second embodiment, configurations of the pair of annular receiving portions 41b and the pair of annular accommodating portions 42a, and shapes of the elongated bores 42d formed at the second case 42 are different from the first embodiment.

Figure 8:
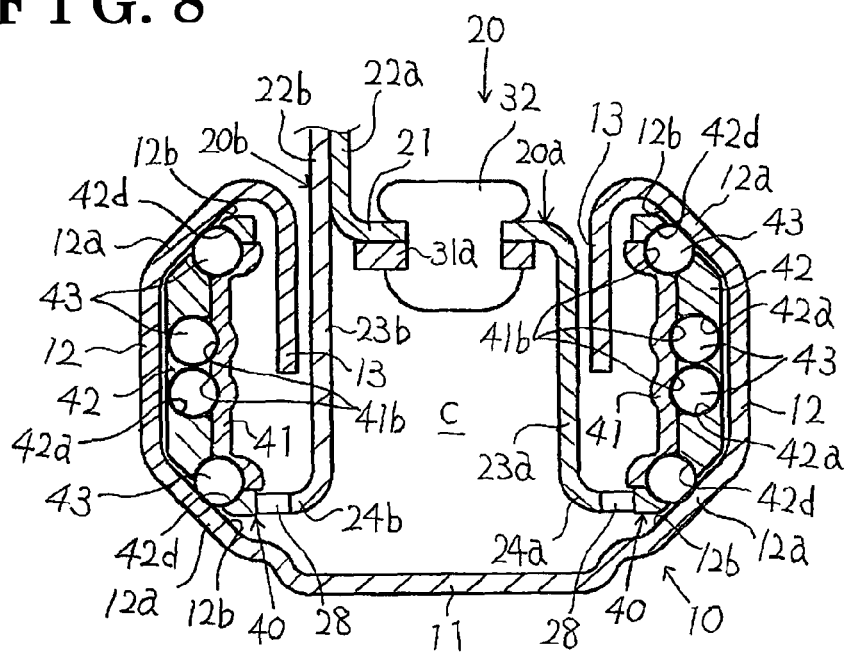
FIG. 8 is a cross-sectional view taken along the line VIII-VIII in FIG. 7.
Figure 9A:
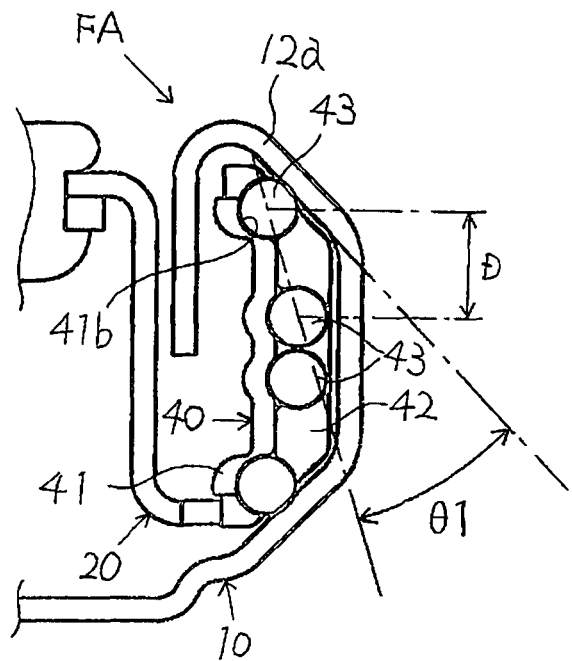
FIG. 9A is an enlarged schematic view of a portion of FIG. 8.

Specifically, as illustrated in FIGS. 8 and 9A, the annular receiving portions 41b and the annular accommodating portions 42a are configured in such a manner that a circulation path of the balls 43 is inclined (i.e., each of the annular receiving portions 41b and the annular accommodating portions 42a includes an inclined circulation passage) so as to form a sharp angle relative to the operating surface 12b of the lower rail 10 in a cross section perpendicular to the extending direction of the rails 10 and 20 in a state where the ball circulation unit 40 is attached to the upper rail 20. More specifically, as illustrated in FIGS. 6A, 6B, and 9A, the annular receiving portions 41b and the annular accommodating portions 42a are formed to be inclined in a direction where an angle θ1 defined between an extension of the circulation path of the balls 43 and the operating surface 12b in the cross section perpendicular to the extending direction of the rails 10 and 20 is an acute angle. That is, as compared to the first embodiment, the annular receiving portions 41b and the annular accommodating portions 42a are configured so that the angle θ1 is more acute than the first embodiment. Accordingly, because a contact angle of each of the balls 43 relative to the operating surface 12b is small, a hitting sound of the ball 43 generated when the ball 43 makes contact with the operating surface 12b is appropriately restrained.

Figure 9B:
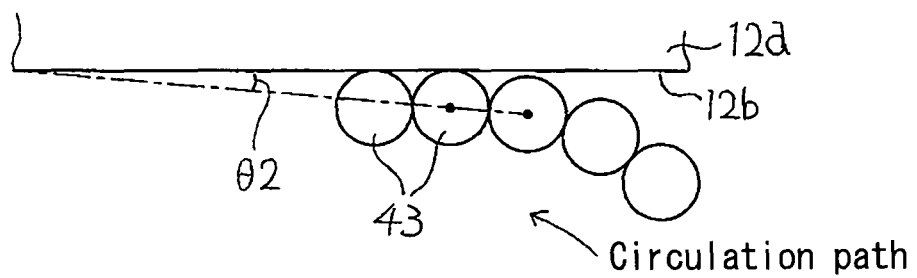
FIG. 9B is a diagram schematically illustrating a perspective view viewed from a direction of an arrow FA in FIG. 9.

FIG. 9B is a schematic view illustrating a relationship between the operating surface 12b of the upper rail 20 and the balls 43 when viewed from an arrow FA direction in FIG. 9A. As illustrated in FIG. 9B, in a case where each of the balls 43 is brought to a contact state from a non-contact state relative to the operating surface 12b, the ball 43 makes contact with the operating surface 12b in a curved path. That is, the annular receiving portions 41b and the annular accommodating portions 42a are configured so that the circulation path of the balls 43 relative to the operating surfaces 12b forms the curved path (i.e., each of the annular receiving portions 41b and the annular accommodating portions 42a includes a curved circulation passage). Accordingly, as illustrated in FIG. 9B, a straight line connecting a center of the ball 43 that is in a state immediately after making contact with the operating surface 12b to a center of the ball 43 arranged adjacent to the aforementioned ball 43 and in the non-contact state relative to the operating surface 12b forms an angle θ2 relative to the operating surface 12b. However, because the ball 43 in the non-contact state then makes contact with the operating surface 12b in the curved path, an approach angle of the ball 43 when the ball 43 makes contact with the operating surface 12b is smaller than the angle θ2. Consequently, the hitting sound generated when the ball 43 makes contact with the operating surface 12b is appropriately restrained.

In the curved circulation passage, the approach angle of the ball 43 relative to the operating surface 12b decreases in association with a decrease of a vertical distance D between the balls 43 adjacent to each other. Thus, because of the aforementioned inclined circulation passage, the distance D is reduced without a change in distance between the centers of the balls 43.

In addition to the change of the shapes of the annular receiving portions 41b and the annular accommodating portions 42a according to the second embodiment from the first embodiment, as illustrated in FIGS. 6B and 7, both the center portions of the elongated bores 42d of the second case 42 are slightly curved so as to be away from each other. At this time, however, such curved shape of the elongated bore 42d is not necessary and the elongated bore 42d may have the same configuration as that of the first embodiment.

According to the second embodiment, the following effects are obtained in addition to the effects of the first embodiment.

Because the inclined circulation passage and the curved circulation passage are provided at the annular receiving portions 41b and the annular accommodating portions 42a, the approach angle of each of the balls 43 relative to the operating surface 12b of the lower rail 10 in a case where the ball 43 is brought to the contact state from the non-contact state relative to the operating surface 12b is reduced. Therefore, the ball 43 gradually makes contact with the operating surface 12b, which reduces the hitting sound generated when the ball 43 makes contact with the operating surface 12b.

Because of the inclined circulation passage, the curved circulation passage is easily provided. Thus, the inclined circulation passage and the curved circulation passage collectively effectively reduce the hitting sound generated when the ball 43 makes contact with the operating surface 12b.

The aforementioned first and second embodiments will be modified as below.

In the second embodiment, the annular receiving portions 41b and the annular accommodating portions 42a may include either the inclined circulation passage or the curved circulation passage. Even in such case, the approach angle of the ball 43 relative to the operating surface 12b of the lower rail 10 is reduced, thereby restraining the hitting sound of the ball 43 relative to the operating surface 12b.

According to the aforementioned first and second embodiments, the flange portions 41a are provided at the first case 41 of each of the ball circulation units 40 and are attached to the attachment portion 28 of the upper rail 20. Alternatively, the similar flange portions may be provided at the second case 42 so that both of the first and second cases 41 and 42 area attachable relative to the attachment portion 28. Further alternatively, the flange portions are only provided at the second case 42 while the flange portions 41a of the first case 41 are omitted. Then, the second case 42 is attached to the attachment portion 28 so that the ball circulation unit 40 is fixed to the upper rail 20.

According to the aforementioned first and second embodiments, in a case where the first case 41 is attached to the attachment portion 28, the biasing members 51 are not necessarily provided.

In addition, according to the aforementioned first and second embodiments, the balls 43 include the metallic balls 43a and the resin balls 43b in a state where the metallic balls 43a and the resin balls 43b are alternately arranged. Alternatively, the balls 43 may only include the metallic balls 43a or the resin balls 43b.

Further, according to the aforementioned first and second embodiments, the first case 41 and the second case 42 constituting the ball circulation unit 40 may be both made of the metallic material or the resin material.

Furthermore, according to the aforementioned first and second embodiments, the slide apparatus is configured so that the vehicle seat is slidably movable in the longitudinal direction of the vehicle. At this time, however, the slide apparatus is not limited to have the aforementioned configuration and may be configured so that the vehicle seat is movable in a width direction of the vehicle, so that the vehicle seat is rotatable, or the like. In addition, the first rail is not limited to the lower rail 10 while the second rail is not limited to the upper rail 20. The first rail may be the upper rail 20 while second rail may be the lower rail 10.

According to the aforementioned first and second embodiments, the slide apparatus includes the lower rail 10 provided at the vehicle, the upper rail 20 supported by the lower rail 10 and being movable relative to the lower rail 10 in the extending direction of the lower rail 10, and the ball circulation unit 40 including the first case 41, the second case 42 engaging with the first case 41, and the plural balls 43 accommodated within the receiving portion defined by the first case 41 and the second case 42, the ball circulation unit 43 being fixed to the outer side portion of the upper rail 20. The receiving portion is provided at the facing surfaces of the first case 41 and the second case 42 and includes the pair of annular receiving portions 41b accommodating the plural balls 43 that are annularly arranged in a rolling and circulating manner. The second case 42 includes the elongated bores 42d connected to the pair of annular receiving portions 41b respectively and extending in the extending direction of the upper rail 20 in a state where the second case 42 is mounted at the upper rail 20. A portion of the balls 43 is exposed from the elongated bores 41d while being inhibited from disengaging from the elongated bores 42d. At least one of the first case 41 and the second case 42 includes the partition wall 41c, 42b separating the balls 43 accommodated within one of the pair of annular receiving portions 41b from the balls 43 accommodated within the other of the pair of annular receiving portions 41b so that the balls 43 accommodated within one of the annular receiving portions 41b and the balls 43 accommodated within the other of the annular receiving portions 41b are inhibited from making contact with one another. The balls 43 exposed from the elongated bores 42d make contact with the operating surface 12b formed at the lower rail 10 and the respective inner surfaces formed at the pair of annular receiving portions 41b, and the balls 43 roll and circulate within the pair of annular receiving portions 41b in association with the relative movement between the lower rail 10 and the upper rail 20.

In addition, according to the aforementioned first and second embodiments, the upper rail 20 includes the attachment portion 28 to which the first case 41 is attached, the first case 41 being made of a metallic material and including the flange portion 41a attached to the upper rail 20.

Further, according to the aforementioned first and second embodiments, the attachment portion 28 is connected to the flange portion 41a via the biasing member 51 so that the second case 42 is fixed to the upper rail 20.

Furthermore, according to the aforementioned second embodiment, each of the annular receiving portions 41b includes at least one of the inclined circulation passage and the curved circulation passage in a cross section perpendicular to the extending direction of the upper rail 20 in a state where the ball circulation unit 40 is mounted at the upper rail 20, the inclined circulation passage being inclined in a direction where the circulation path of the balls 43 forms a sharp angle relative to the operating surface 12b, the curved circulation passage at which the balls 43 make contact with the operating surface 12b in the curved path.

Furthermore, according to the aforementioned first and second embodiments, the balls 43 include the metallic balls 43a and the resin balls 43b, the metallic balls 43a and the resin balls 43b being alternately arranged to one another.

Furthermore, according to the aforementioned first and second embodiments, the ball circulation unit 40 for the slide apparatus, the slide apparatus including the lower rail 10 provided at the vehicle and the upper rail 20 supported by the lower rail 10 and being movable relative to the lower rail 10 in the extending direction of the lower rail 10, the ball circulation unit 40 includes the first case 41, the second case 42 engaging with the first case 41, and the plural balls 43 accommodated within the receiving portion defined by the first case 41 and the second case 42, the ball circulation unit 40 being adapted to be fixed to the outer side portion of the upper rail 20. The receiving portion is provided at the facing surfaces of the first case 41 and the second case 42 and includes the pair of annular receiving portions accommodating the plural balls 43 that are annularly arranged in a rolling and circulating manner. The second case 42 includes the elongated bores 42d connected to the pair of annular receiving portions 41b respectively and extending in the extending direction of the upper rail 20 in a state where the second case 42 is mounted at the upper rail 20. A portion of the balls 43 is exposed from the elongated bores 42d while being inhibited from disengaging from the elongated bores 42d. At least one of the first case 41 and the second case 42 includes the partition wall 41c, 42b separating the balls 43 accommodated within one of the pair of annular receiving portions 41b from the balls 43 accommodated within the other of the pair of annular receiving portions 41b so that the balls 43 accommodated within one of the annular receiving portions 41b and the balls 43 accommodated within the other of the annular receiving portions 41b are inhibited from making contact with one another In a case where the ball circulation unit 40 is applied to the slide apparatus, the balls 43 exposed from the elongated bores 42d make contact with the operating surface 12b formed at the lower rail 10 and the respective inner surfaces formed at the pair of annular receiving portions 41b, and the balls roll and circulate within the pair of annular receiving portions 41b in association with the relative movement between the lower rail 10 and the upper rail 20.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A slide apparatus for a vehicle, comprises:
a first rail provided at a vehicle;
a second rail supported by the first rail and being movable relative to the first rail in an extending direction of the first rail; and
a rolling element circulation unit separately provided from the second rail, the rolling element circulation unit including a first case, a second case engaging with the first case, and a plurality of rolling elements accommodated within a receiving portion defined by the first case and the second case, the rolling element circulation unit being fixed to an outer side portion of the second rail,
the receiving portion provided at facing surfaces of the first case and the second case and including first and second annular receiving portions accommodating the plurality of rolling elements that are annularly arranged in a rolling and circulating manner,
the second case including elongated bores connected to the first and second annular receiving portions respectively and extending in an extending direction of the second rail in a state where the second case is mounted at the second rail, a portion of the rolling elements being exposed from the elongated bores while being inhibited from disengaging from the elongated bores,
at least one of the first case and the second case including a partition wall separating the rolling elements accommodated within the first annular receiving portion from the rolling elements accommodated within the second annular receiving portion so that the rolling elements accommodated within the first annular receiving portion and the rolling elements accommodated within the second annular receiving portion are inhibited from making contact with one another,
wherein the rolling elements exposed from the elongated bores make contact with an operating surface formed at the first rail and respective inner surfaces formed at the first and second annular receiving portions, and the rolling elements roll and circulate within the first and second annular receiving portions in association with a relative movement between the first rail and the second rail, and
wherein each of the first and second annular receiving portions includes at least one of an inclined circulation passage and a curved circulation passage in a cross section perpendicular to the extending direction of the second rail in a state where the rolling element circulation unit is mounted at the second rail, the inclined circulation passage being inclined in a direction where a circulation path of the rolling elements forms a sharp angle relative to the operating surface, the curved circulation passage at which the rolling elements make contact with the operating surface in a curved path.

2. The slide apparatus according to claim 1, wherein the second rail includes an attachment portion to which the first case is attached, the first case being made of a metallic material and including a flange portion attached to the second rail.

3. The slide apparatus according to claim 2, wherein the attachment portion is connected to the flange portion via a biasing member so that the second case is fixed to the second rail.

4. The slide apparatus according to claim 1, wherein the rolling elements include metallic rolling elements and resin rolling elements, the metallic rolling elements and the resin rolling elements being alternately arranged to one another.

5. A rolling element circulation unit for a slide apparatus for a vehicle, the slide apparatus including a first rail provided at a vehicle and a second rail supported by the first rail and being movable relative to the first rail in an extending direction of the first rail, the rolling element circulation unit comprising:
a first case;
a second case engaging with the first case; and
a plurality of rolling elements accommodated within a receiving portion defined by the first case and the second case, the rolling element circulation unit being adapted to be fixed to an outer side portion of the second rail,
the receiving portion provided at facing surfaces of the first case and the second case and including first and second annular receiving portions accommodating the plurality of rolling elements that are annularly arranged in a rolling and circulating manner,
the second case including elongated bores connected to the first and second annular receiving portions respectively and extending in the extending direction of the second rail in a state where the second case is mounted at the second rail, a portion of the rolling elements being exposed from the elongated bores while being inhibited from disengaging from the elongated bores,
at least one of the first case and the second case including a partition wall separating the rolling elements accommodated within the first annular receiving portion from the rolling elements accommodated within the second annular receiving portion so that the rolling elements accommodated within the first annular receiving portion and the rolling elements accommodated within the second annular receiving portion are inhibited from making contact with one another,
wherein in a case where the rolling element circulation unit is applied to the slide apparatus, the rolling elements exposed from the elongated bores make contact with an operating surface formed at the first rail and respective inner surfaces formed at the first and second annular receiving portions, and the rolling elements roll and circulate within the first and second annular receiving portions in association with a relative movement between the first rail and the second rail,
wherein the rolling element circulation unit is separately provided from the second rail, and
wherein the second rail includes an attachment portion to which the first case is attached, the first case being made of a metallic material and including a flange portion attached to the second rail.

6. A slide apparatus for a vehicle, comprises:
a first rail provided at a vehicle;
a second rail supported by the first rail and being movable relative to the first rail in an extending direction of the first rail; and
a rolling element circulation unit including a first case, a second case engaging with the first case, and a plurality of rolling elements accommodated within a receiving portion defined by the first case and the second case, the rolling element circulation unit being fixed to an outer side portion of the second rail,
the receiving portion provided at facing surfaces of the first case and the second case and including first and second annular receiving portions accommodating the plurality of rolling elements that are annularly arranged in a rolling and circulating manner,
the second case including elongated bores connected to the first and second annular receiving portions respectively and extending in an extending direction of the second rail in a state where the second case is mounted at the second rail, a portion of the rolling elements being exposed from the elongated bores while being inhibited from disengaging from the elongated bores,
at least one of the first case and the second case including a partition wall separating the rolling elements accommodated within the first annular receiving portion from the rolling elements accommodated within the second annular receiving portion so that the rolling elements accommodated within the first annular receiving portion and the rolling elements accommodated within the second annular receiving portion are inhibited from making contact with one another,
wherein the rolling elements exposed from the elongated bores make contact with an operating surface formed at the first rail and respective inner surfaces formed at the first and second annular receiving portions, and the rolling elements roll and circulate within the first and second annular receiving portions in association with a relative movement between the first rail and the second rail, and
wherein the second rail includes an attachment portion to which the first case is attached, the first case being made of a metallic material and including a flange portion attached to the second rail.

7. The slide apparatus according to claim 6, wherein the attachment portion is connected to the flange portion via a biasing member so that the second case is fixed to the second rail.

8. The slide apparatus according to claim 6, wherein each of the first and second annular receiving portions includes at least one of an inclined circulation passage and a curved circulation passage in a cross section perpendicular to the extending direction of the second rail in a state where the rolling element circulation unit is mounted at the second rail, the inclined circulation passage being inclined in a direction where a circulation path of the rolling elements forms a sharp angle relative to the operating surface, the curved circulation passage at which the rolling elements make contact with the operating surface in a curved path.

9. The slide apparatus according to claim 6, wherein the rolling elements include metallic rolling elements and resin rolling elements, the metallic rolling elements and the resin rolling elements being alternately arranged to one another.

* * * * *